United States Patent
Tokuoka

(10) Patent No.: US 9,425,471 B2
(45) Date of Patent: Aug. 23, 2016

(54) FUEL CELL SYSTEM

(71) Applicant: NISSAN MOTOR CO., LTD., Yokohama-shi, Kanagawa (JP)

(72) Inventor: Takamitsu Tokuoka, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 64 days.

(21) Appl. No.: 14/384,202

(22) PCT Filed: Mar. 12, 2013

(86) PCT No.: PCT/JP2013/056715
§ 371 (c)(1),
(2) Date: Sep. 10, 2014

(87) PCT Pub. No.: WO2013/137217
PCT Pub. Date: Sep. 19, 2013

(65) Prior Publication Data
US 2015/0044599 A1     Feb. 12, 2015

(30) Foreign Application Priority Data

Mar. 14, 2012 (JP) .................................. 2012-057761

(51) Int. Cl.
*H01M 8/04* (2016.01)

(52) U.S. Cl.
CPC ...... *H01M 8/04089* (2013.01); *H01M 8/04231* (2013.01); *Y02E 60/50* (2013.01)

(58) Field of Classification Search
CPC .................... H01M 8/04388; H01M 8/04402; H01M 8/04395; H01M 8/0441
See application file for complete search history.

(56) References Cited

U.S. PATENT DOCUMENTS

| 6,230,742 B1 * | 5/2001 | Bircann | F16K 1/443 137/625.34 |
| 2010/0021783 A1 * | 1/2010 | Osada | H01M 8/04089 429/424 |

FOREIGN PATENT DOCUMENTS

JP          2009-123550 A     6/2009

* cited by examiner

*Primary Examiner* — Stewart Fraser
*Assistant Examiner* — Olatunji Godo
(74) *Attorney, Agent, or Firm* — Drinker Biddle & Reath LLP

(57) ABSTRACT

A fuel cell system includes a fuel cell stack, a cathode supply flow passage which is connected to the fuel cell stack and through which cathode gas flows, a cathode off-gas flow passage which is connected to the fuel cell stack and discharges cathode off-gas, a bypass flow passage which is branched off from the cathode supply flow passage and through which a part of the cathode gas flows while bypassing the fuel cell stack, a bypass valve configured to regulate a bypass flow rate in the bypass flow passage and include an atmosphere communication hole, and an anode off-gas flow passage which is connected to the fuel cell stack and discharges anode off-gas. The anode off-gas flow passage joins the bypass flow passage at a side downstream of the cathode off-gas flow passage or the bypass valve, and the bypass valve is formed with a clearance configured to leak a predetermined quantity of gas even in a fully closed state.

6 Claims, 5 Drawing Sheets

FUEL CELL SYSTEM

TECHNICAL FIELD

This invention relates to a fuel cell system.

BACKGROUND ART

JP2009-123550A discloses a fuel cell system in which a part of cathode gas discharged from a cathode compressor is bypassed without being supplied to a fuel cell stack.

SUMMARY OF INVENTION

The present inventors are developing a fuel cell system for discharging anode off-gas flowing out from a fuel cell stack to the atmosphere after mixing the anode off-gas with cathode gas to dilute the concentration of the anode off-gas by joining an anode off-gas flow passage to a cathode off-gas flow passage. In the system of the present inventors, a bypass flow passage is also joined to the cathode off-gas flow passage. In such a system, a phenomenon in which the anode off-gas flows back in the bypass flow passage may occur such as when an atmosphere communication hole is present in a bypass valve or the like and water is present in an exhaust muffler. In such a case, the anode off-gas flowing back may possibly flow out to the atmosphere from the communication hole.

The present invention was developed, focusing on such a possibility. The present invention aims to provide a fuel cell system capable of suppressing the outflow of anode off-gas to the atmosphere if an atmosphere communication hole is present in a bypass valve or the like.

A fuel cell system according to one aspect of the present invention includes a fuel cell stack, a cathode supply flow passage which is connected to the fuel cell stack and through which cathode gas flows, a cathode off-gas flow passage which is connected to the fuel cell stack and discharges cathode off-gas, a bypass flow passage which is branched off from the cathode supply flow passage and through which a part of the cathode gas flows while bypassing the fuel cell stack, a bypass valve configured to regulate a bypass flow rate in the bypass flow passage and include an atmosphere communication hole, and an anode off-gas flow passage which is connected to the fuel cell stack and discharges anode off-gas. The anode off-gas flow passage joins the bypass flow passage at a side downstream of the cathode off-gas flow passage or the bypass valve, and the bypass valve is formed with a clearance configured to leak a predetermined quantity of gas even in a fully closed state.

Embodiments and advantages of the present invention are described in detail below with reference to the accompanying drawings.

DESCRIPTION OF EMBODIMENTS

First Embodiment

Figure 1:
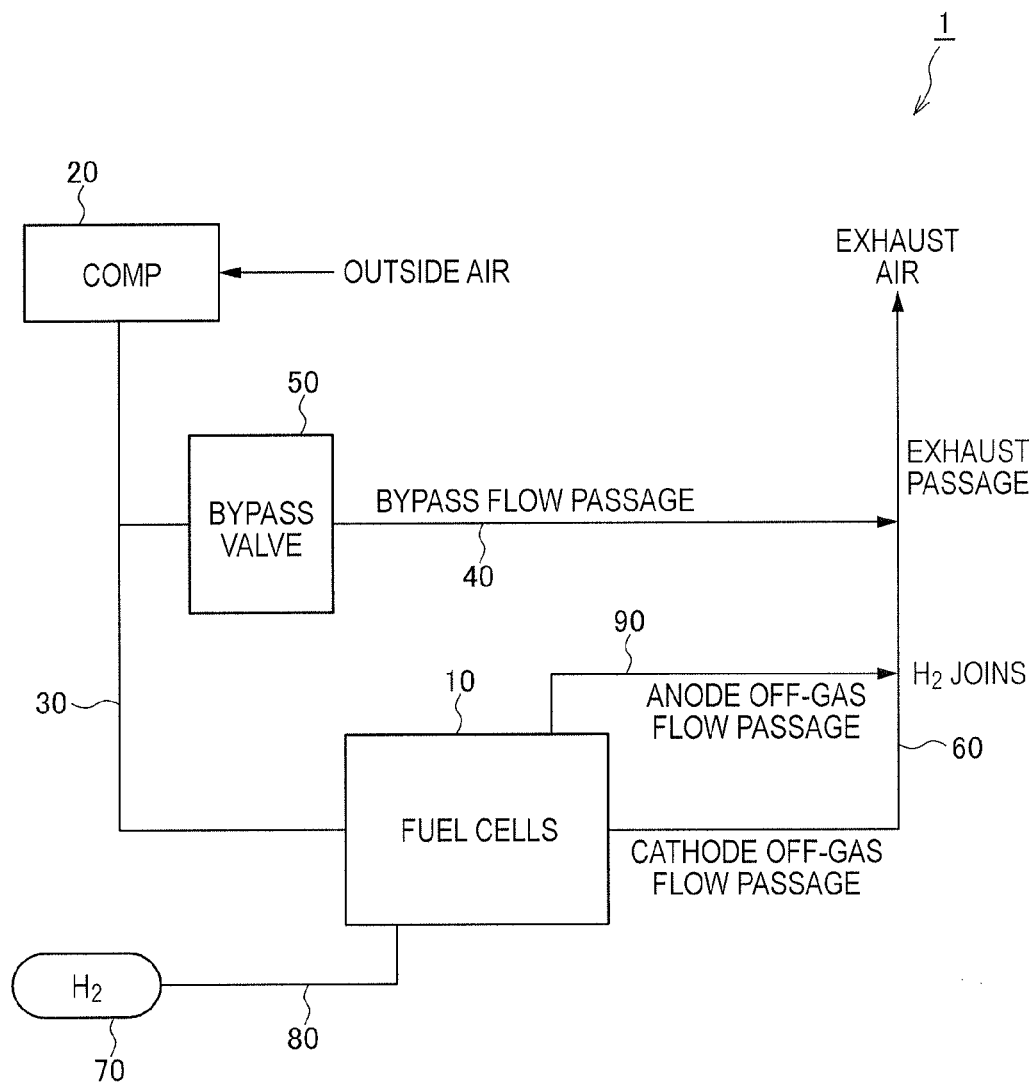
FIG. 1 is a diagram showing a first embodiment of a fuel cell system according to the present invention.

FIG. 1 is a diagram showing a first embodiment of a fuel cell system according to the present invention.

The fuel cell system 1 includes a fuel cell stack 10, a cathode compressor 20, a cathode supply flow passage 30, a bypass flow passage 40, a bypass valve 50, a cathode off-gas flow passage 60, an anode tank 70, an anode supply flow passage 80 and an anode off-gas flow passage 90.

The fuel cell stack 10 generates power by being supplied with anode gas and cathode gas.

The cathode compressor 20 is provided in the cathode supply flow passage 30. The cathode compressor 20 feeds air under pressure.

The cathode supply flow passage 30 is connected to the fuel cell stack 10. The air fed under pressure by the cathode compressor 20 flows in the cathode supply flow passage 30.

The bypass flow passage 40 is branched off from the cathode supply flow passage 30 and joins the cathode off-gas flow passage 60. A part of the air fed under pressure by the cathode compressor 20 (excess air not required by the fuel cell stack 10) is branched off and flows in the bypass flow passage 40.

The bypass valve 50 is provided at an intermediate position of the bypass flow passage 40. The bypass valve 50 regulates a flow rate of the cathode gas flowing in the bypass flow passage 40.

The cathode off-gas flow passage 60 is connected to the fuel cell stack 10 and the cathode off-gas flowing out from the fuel cell stack 10 flows therein.

The anode tank 70 is provided in the anode supply flow passage 80. The anode tank 70 is a sealed container storing the anode gas (hydrogen). The anode tank 70 supplies the stored anode gas (hydrogen) to the fuel cell stack 10.

The anode supply flow passage 80 is connected to the fuel cell stack 10. The anode gas (hydrogen) flowing out from the anode tank 70 flows in the anode supply flow passage 80.

One end of the anode off-gas flow passage 90 is connected to the fuel cell stack 10 and the anode off-gas flows in the anode off-gas flow passage 90, and the other end thereof is connected to the cathode off-gas flow passage 60 in the present embodiment.

Figure 2A:
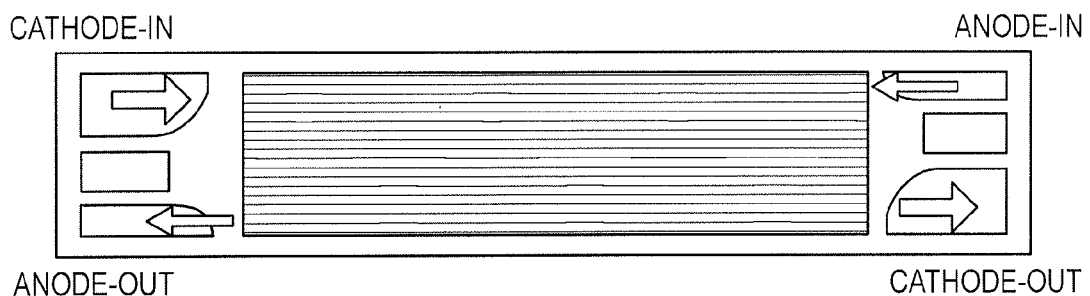
FIG. 2A is a diagram showing the reaction of an electrolyte membrane in a fuel cell stack.
Figure 2B:
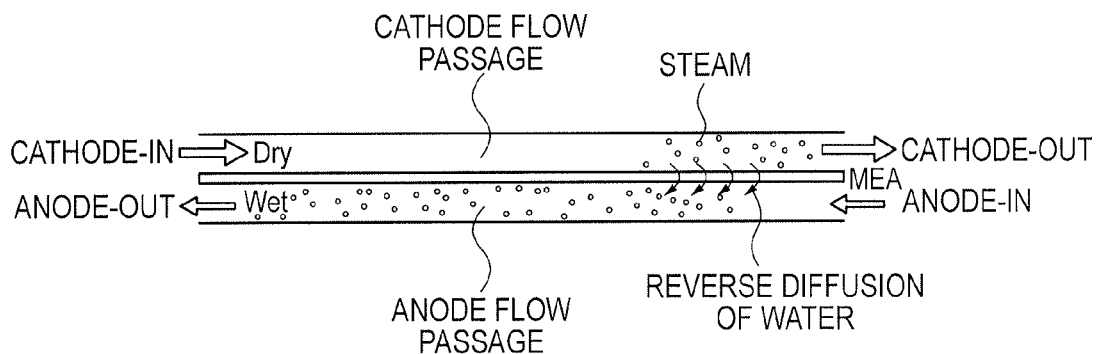
FIG. 2B is a diagram showing the reaction of the electrolyte membrane in the fuel cell stack.

FIGS. 2A and 2B are diagrams showing the reaction of an electrolyte membrane in the fuel cell stack.

As described above, the fuel cell stack 10 generates power by being supplied with reaction gas (cathode gas $O_2$, anode gas $H_2$). The fuel cell stack 10 is configured by laminating several hundreds of membrane electrode assemblies (MEAs) in each of which a cathode electrode catalyst layer and an anode electrode catalyst layer are formed on opposite surfaces of an electrolyte membrane. In each membrane electrode assembly (MEA), the following reactions proceed according to a load in the cathode and anode electrode catalyst layers to generate power. Note that FIG. 2A shows one MEA. Here is shown an example in which the anode gas is supplied (anode-in) and discharged from a diagonal side (anode-out) while the cathode gas is supplied to the MEA (cathode-in) and discharged from a diagonal side (cathode-out).

[Formulae 1]

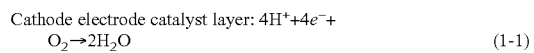

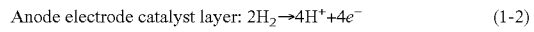

As shown in FIG. 2B, the reaction of the above formula (1-1) proceeds to produce steam as the reaction gas (cathode gas $O_2$) flows in the cathode flow passage. Then, relative humidity increases on a downstream side of the cathode flow passage. Using a relative humidity difference between a cathode side and an anode side as a driving force, water is reversely diffused to humidify an anode upstream side. This moisture further evaporates from the MEA to the anode flow passage to humidify the reaction gas (anode gas $H_2$) flowing in the anode flow passage, and then carried to an anode downstream side to humidify the MEA on the anode downstream side (cathode upstream side).

The reaction as shown in the above formula (1-2) proceeds in the anode electrode catalyst layer, but excess anode gas $H_2$ flows out without reacting. If such unreacted gas is present in large quantity, the consumption efficiency of the anode gas $H_2$ is poor. Accordingly, to increase the consumption efficiency of the anode gas $H_2$, a fuel cell system of an anode dead end type is known in which a purge valve is provided in an anode off-gas flow passage 90 and normally closed. In such a fuel cell system, nitrogen $N_2$ in the air permeates to an anode flow passage via electrolyte membranes. Such nitrogen $N_2$ is stored in a buffer tank provided immediately downstream of a fuel cell stack 10 and purged to the anode off-gas flow passage 90 when a purge valve is opened at a purging timing. At this time, hydrogen $H_2$ in the buffer tank also flows out to the anode off-gas flow passage 90 together with the nitrogen $N_2$. Such gas is called anode off-gas. The hydrogen $H_2$ contained in this anode off-gas is discharged after being mixed with cathode off-gas (air) flowing in a cathode off-gas flow passage 60 to dilute the concentration thereof.

Here, a problem to be solved is described to facilitate the understanding of the present embodiment. The present inventors are studying the use of a poppet type valve as the bypass valve 50. In the valve of such a type, the interior communicates with the atmosphere via an atmosphere communication hole. Thus, if the bypass valve having such a configuration is used, a phenomenon in which the anode off-gas flows back in the bypass flow passage 40 may occur such as when water is present in an exhaust muffler. The present inventors found out the presence of a possibility of the outflow of the flowing back anode off-gas to the atmosphere from the atmosphere communication hole in such a case. In this case, hydrogen $H_2$ contained in the anode off-gas flows out to the atmosphere from the atmosphere communication hole.

Accordingly, the present inventors propose a fuel cell system capable of avoiding such a situation.

Specific contents are described below.

Figure 3:
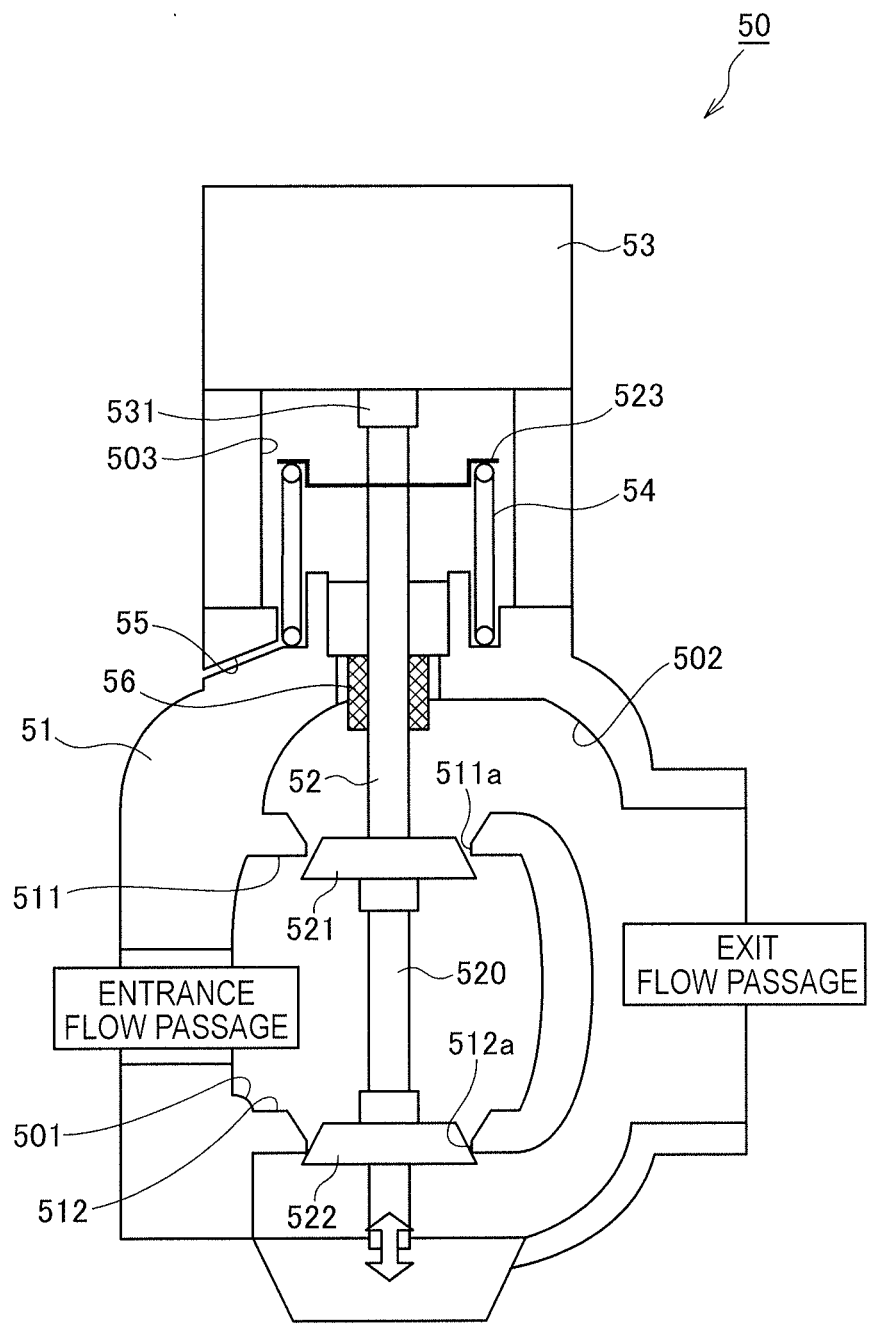
FIG. 3 is a diagram showing the structure of a bypass valve which is a characteristic configuration of the embodiment.

FIG. 3 is a diagram showing the structure of the bypass valve which is a characteristic configuration of the present embodiment.

The bypass valve 50 includes a housing 51, a valve body 52 and a motor 53. This bypass valve 50 is of a double poppet type in which two umbrella valves 521, 522 are fixed to one stem shaft 520 in the valve body 52.

The interior of the housing 51 is partitioned into an upstream chamber 501, a downstream chamber 502 and a spring chamber 503. The upstream and downstream chambers 501, 502 are partitioned by two partition walls (partition wall 511 and partition wall 512). In FIG. 3, the inside of the two partition walls (partition wall 511 and partition wall 512) is the upstream chamber 501. The outside of the two partition walls (partition wall 511 and partition wall 512) is the downstream chamber 502. The upstream chamber 501 is connected to an upstream side (cathode supply flow passage side) of the bypass flow passage 40. The downstream chamber 502 is connected to a downstream side (cathode off-gas flow passage side) of the bypass flow passage 40. The partition wall 511 is formed with a hole 511a. The partition wall 512 is formed with a hole 512a. As described later, the periphery of the hole 512a serves as a valve seat and the umbrella valve 522 of the valve body 52 is in contact with that valve seat in the present embodiment.

The spring chamber 503 is formed at an outer outside (upper side in FIG. 3) of the downstream chamber 502. A bush 56 is provided in a hole connecting the downstream chamber 502 and the spring chamber 503. The spring chamber 503 communicates with the atmosphere via an atmosphere communication hole 55. Since such a structure is adopted, even if moisture or the like is present in the spring chamber 503, such moisture is allowed to escape to the atmosphere from the atmosphere communication hole 55.

The valve body 52 includes the stem shaft 520, the umbrella valves 521, 522 and a spring retainer 523.

The umbrella valves 521, 522 and the spring retainer 523 are fixed to the stem shaft 520. Accordingly, if the stem shaft 520 moves in an axial direction (vertical direction in FIG. 3), the umbrella valves 521, 522 and the spring retainer 523 also move in the axial direction together with the stem shaft 520. It should be noted that a distance between the umbrella valves 521 and 522 is shorter than that between the partition walls 511 and 512. In the present embodiment, as shown in FIG. 3, the umbrella valve 521 is separated from the valve seat on the periphery of the hole 511a and located in the upstream chamber 501 in a state where the umbrella valve 522 of the valve body 52 is in contact with the valve seat on the periphery of the hole 512a (initial state). The stem shaft 520 is inserted through the bush 56. The spring retainer 523 is in contact with the spring 54.

The motor 53 is provided on the top of the housing 51. The motor 53 has a mechanism for extending and contracting a motor shaft 531 in response to a drive command signal. The motor shaft 531 is in contact with one end (upper end in FIG. 3) of the stem shaft 520.

As shown in FIG. 3, in the initial state (state where an opening of the bypass valve 50 is smallest; it should be noted that such a state where the opening of the bypass valve 50 is smallest is referred to as a "fully closed state" as appropriate), the umbrella valve 522 is in contact with the valve seat to close the hole 512a. Since the umbrella valve 521 is not in contact with the valve seat, there is a clearance between the partition wall 511 and the umbrella valve 521 and the hole 511a is not closed.

If the motor shaft 531 of the motor 53 is extended in the initial state, the stem shaft 520 moves downward and the umbrella valve 522 is separated from the valve seat. At this time, the spring 54 is compressed.

If the motor shaft 531 is contracted, the spring 54 extends to push the spring retainer 523 upward. This causes the stem shaft 520 to move upward. The stem shaft 520 moves until the umbrella valve 522 comes into contact with the valve seat.

It should be noted that the umbrella valve 522 is in contact with the valve seat to close the hole 512a, but the umbrella valve 521 is not in contact with the valve seat in the initial state (state where the opening of the bypass valve 50 is smallest). The clearance is present between the partition wall 511 and the umbrella valve 521 and the hole 511a is not closed.

Figure 4:
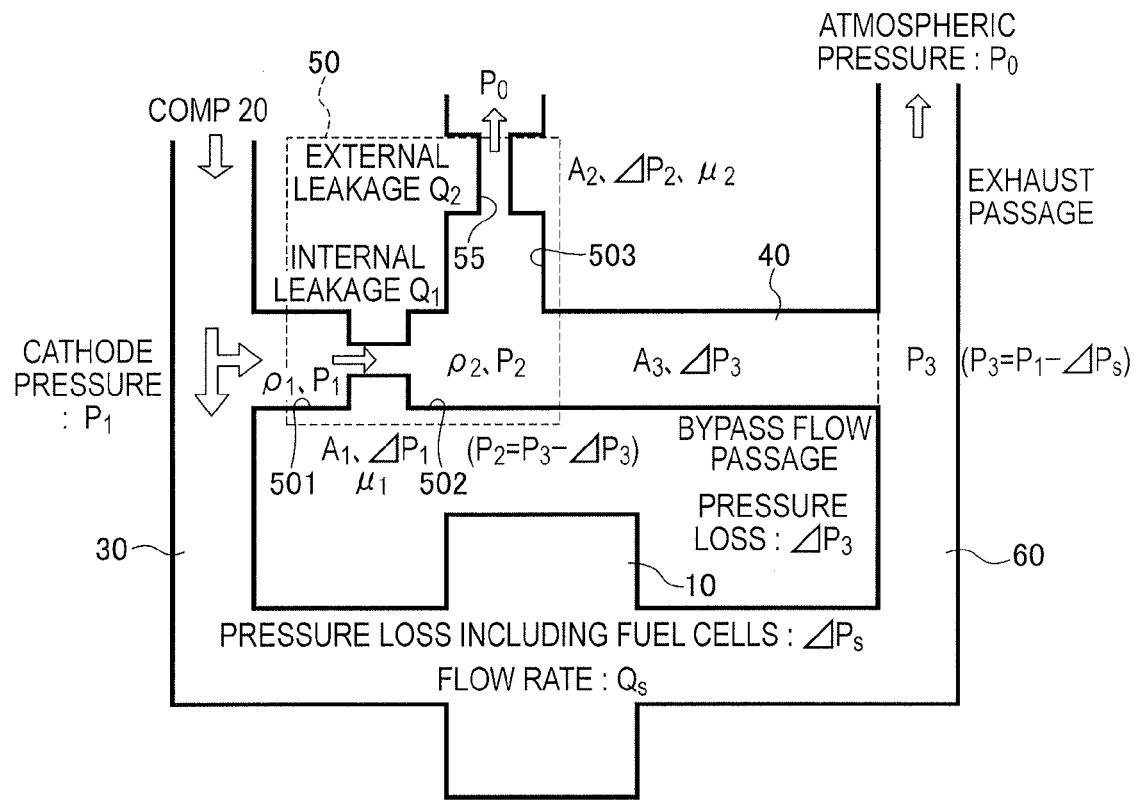
FIG. 4 is a diagram modeling an initial state.

Such a state is modeled as shown in FIG. 4.

Since the clearance is present between the partition wall 511 and the umbrella valve 521, the cathode gas (internal leaking gas) leaks according to a pressure difference between a pressure P1 in the upstream chamber 501 of the bypass valve 50 and a pressure P2 in the downstream chamber 502. In this embodiment, the back flow of the anode off-gas is prevented by this leakage (flow) of the cathode gas. Thus, the clearance between the partition wall 511 and the umbrella valve 521 in the initial state is set to achieve such an anode gas flow rate. A specific numerical value is set by an experiment, simulation or the like. It should be noted that since there is also gas leaking from the spring chamber 503 to the atmosphere via the atmosphere communication hole 55 (external leaking gas) as described above, the numerical value is set, considering also a flow rate of such gas.

An internal leakage quantity Q1 and an external leakage quantity Q2 are expressed as in the following formulae. It should be noted that ρ denotes a density of the cathode gas and f is a function representing a leakage characteristic.

[Formulae 2]

$$Q_1 = f_1(P_1, P_2, \rho_1, \alpha_1, \mu_1) \quad (2\text{-}1)$$

$$Q_2 = f_2(P_2, P_0, \rho_2, \alpha_2, \mu_2) \quad (2\text{-}2)$$

A condition for preventing the back flow is expressed by the following formula.

[Formula 3]

$$Q_1 > Q_2 \quad (3)$$

A cathode pressure $P_1$, a pressure loss $P_2$ of the fuel cell stack, a leakage characteristic $f_2$ of a bush part of the bypass valve and a pressure loss $\Delta P_3$ of the bypass flow passage 40 are determined from a system design and parts producibility. The leakage quantity is managed by designing such a leakage quantity $Q_1$ as to satisfy the above formula for these prerequisites.

If this condition holds, the cathode gas branched off from the cathode supply flow passage 30 constantly flows from an upstream side to a downstream side (from the left side to the right side in FIGS. 1 and 4) at least in the bypass passage 40. Thus, the back flow of the anode off-gas is prevented.

Further, in the present embodiment, the umbrella valve 522 distant from the spring chamber 503 and the atmosphere communication hole 55 is in contact with the valve seat to close the hole 512a in the initial state (state where the opening of the bypass valve 50 is smallest). On the other hand, since the umbrella valve 521 close to the spring chamber 503 and the atmosphere communication hole 55 is not in contact with the valve seat, the clearance is present between the partition wall 511 and the umbrella valve 521 and the hole 511a is not closed. Thus, internal leakage occurs. The motor 53 is present very close to the spring chamber 503. If the motor 53 should be exposed to the flowing back anode off-gas, it may be rusted due to the influence of steam contained in the anode off-gas. However, by causing internal leakage from the side close to the spring chamber 503 and the atmosphere communication hole 55 as in the present embodiment, the cathode gas branched off from the cathode supply flow passage 30 can flow into the spring chamber 503 and the atmosphere communication hole 55 and also in the bypass flow passage 40. Thus, the exposure of the motor 53 to the anode off-gas can be prevented. Further, the clearance between the partition wall 511 and the umbrella valve 521 is provided in consideration of the quantity of the gas flowing into the atmosphere communication hole 55, i.e. so as to allow leakage of a larger quantity of gas (internal leakage) than gas leaking to the atmosphere from the atmosphere communication hole 55 (external leakage). This can ensure the flow in the bypass flow passage 40 and prevent the back flow of the anode off-gas.

Further, in the present embodiment, the umbrella valve 521 is separated from the valve seat on the periphery of the hole 511a and located in the upstream chamber 501 in the state where the umbrella valve 522 of the valve body 52 is in contact with the valve seat on the periphery of the hole 512a (initial state) as shown in FIG. 3. Since an air pressure is high in the upstream chamber 501, large energy is necessary to actuate the valve body 52 against such an air pressure. However, since a force resulting from the air pressure is canceled at the umbrella valves 521, 522 in the structure of the present embodiment, the valve body 52 is easily actuated.

It should be noted that the umbrella valve 522 is in contact with the valve seat to close the hole 512a in the present embodiment. The umbrella valve 522 and the valve seat may be worn with time. By a design considering also such a change over time, functions and effects of the present embodiment can be made further reliable.

Further, the functions and effects of the present embodiment can be made reliable by the aforementioned formulae.

Second Embodiment

Figure 5:
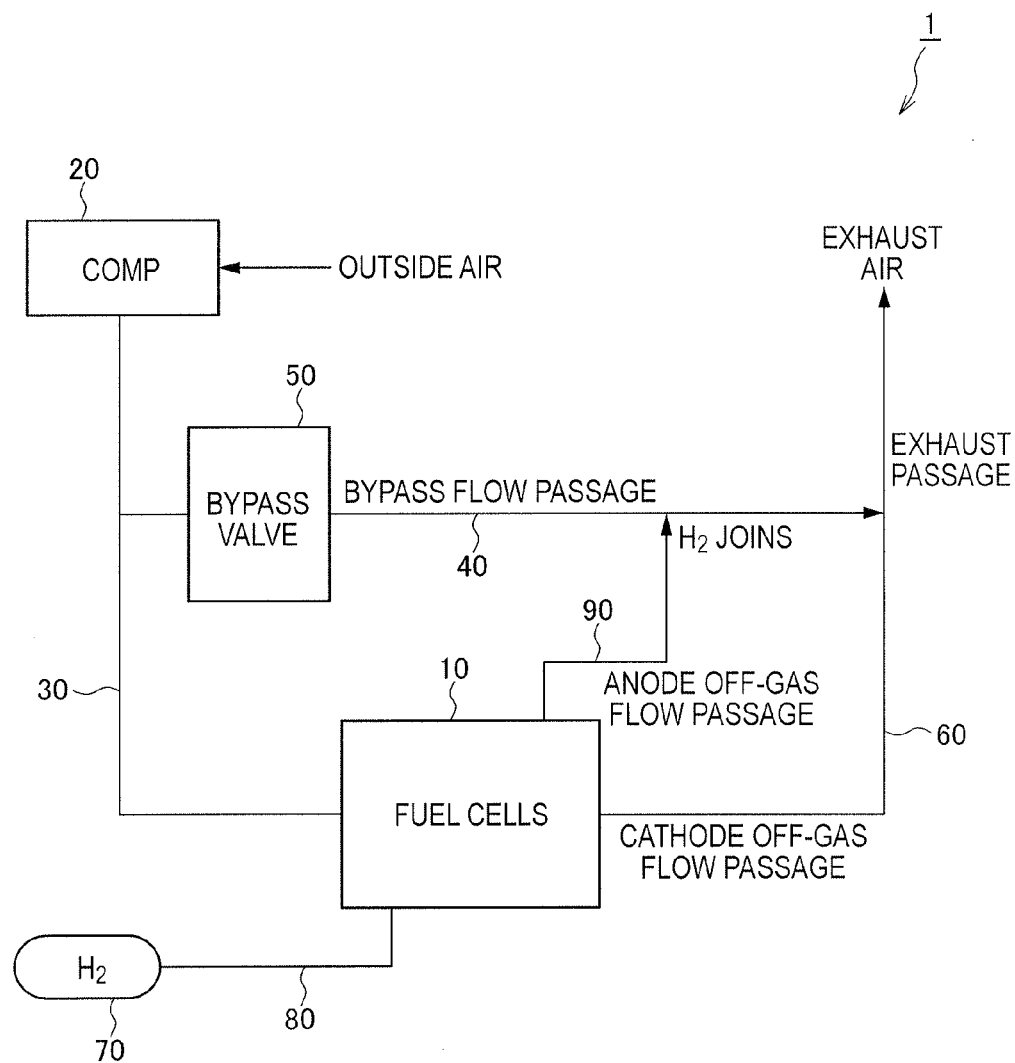
FIG. 5 is a view showing a second embodiment of the fuel cell system according to the present invention.

FIG. 5 is a diagram showing a second embodiment of the fuel cell system according to the present invention.

It should be noted that components having the same functions as the aforementioned components are denoted by the same reference signs and repeated description is omitted as appropriate.

In a fuel cell system 1 of the present embodiment, one end of an anode off-gas flow passage 90 is connected to a fuel cell stack 10 and anode off-gas flows in the anode off-gas flow passage 90, and the other end thereof is connected to a bypass flow passage 40.

Even if such a configuration is adopted, functions and effects similar to those of the first embodiment are obtained.

Although the embodiments of the present invention have been described above, the above embodiments are merely an illustration of some application examples of the present invention and not intended to limit the technical scope of the present invention to the specific configurations of the above embodiments.

For example, in the above embodiments, the distance between the umbrella valve 521 and 522 is shorter than that between the partition walls 511 and 512. However, there is no limitation to this. The distance between the umbrella valve 521 and 522 may be longer than that between the partition walls 511 and 512. If such a configuration is adopted, the umbrella valve 521 of the valve body 52 is in contact with the valve seat on the periphery of the hole 511a and the umbrella valve 522 is separated from the valve seat on the periphery of the hole 512a and located in the downstream chamber 502 in the initial state. Such a configuration is also within the technical scope of the present embodiment.

Further, the distance between the umbrella valve 521 and 522 may be equal to that between the partition walls 511 and 512. In such a case, at least one of the umbrella valves 521, 522 has only to be formed with a communication hole allowing communication between the upstream chamber 501 and the downstream chamber 502. Such a configuration is also within the technical scope of the present embodiment.

Furthermore, although the bypass valve 50 is of the poppet type in the above embodiments, it may be of a butterfly type.

It should be noted that the above embodiments may be appropriately combined.

The present application claims a priority based on Japanese Patent Application No. 2012-57761 filed on Mar. 14, 2012, all the contents of which are incorporated hereby by reference.

The invention claimed is:
1. A fuel cell system, comprising:
a fuel cell stack;
a cathode supply flow passage which is connected to the fuel cell stack and through which cathode gas flows;

a cathode off-gas flow passage which is connected to the fuel cell stack and discharges cathode off-gas;

a bypass flow passage which is branched off from the cathode supply flow passage, joins the cathode off-gas flow passage, and through which a part of the cathode gas flows while bypassing the fuel cell stack;

a bypass valve configured to regulate a bypass flow rate in the bypass flow passage; and an anode off-gas flow passage which is connected to the fuel cell stack and discharges anode off-gas;

wherein:

the anode off-gas flow passage joins the bypass flow passage at a side downstream of the cathode off-gas flow passage or the bypass valve;

a housing of the bypass valve is formed with an atmosphere communication hole allowing communication between the interior of the housing and atmosphere and having a possibility of causing the anode off-gas flowing back in the bypass flow passage to flow out to the atmosphere; and a clearance is formed in a chamber in the bypass valve through which the cathode gas flows from the cathode supply flow passage, the clearance being configured to leak a predetermined quantity of gas toward the cathode off-gas flow passage even in a fully closed state.

2. The fuel cell system according to claim 1, wherein:

the bypass valve is of a double poppet type in which a valve body is composed of one stem shaft and two umbrella valves, one of the two umbrella valves is in contact with a valve seat, but the other umbrella valve is not in contact with a valve seat to define the clearance and allow leakage of the predetermined quantity of gas when the bypass valve is in the fully closed state.

3. The fuel cell system according to claim 2, wherein:

the one umbrella valve is the umbrella valve distant from the atmosphere communication hole; and the other umbrella valve is the umbrella valve close to the atmosphere communication hole.

4. The fuel cell system according to claim 1, wherein:

the predetermined quantity is larger than an external leakage quantity leaking to the atmosphere from the atmosphere communication hole.

5. The fuel cell system according to claim 1, wherein:

the bypass valve is configured to allow leakage of the predetermined quantity of gas in the fully closed state even if the bypass valve is worn with time.

6. The fuel cell system according to claim 1, wherein:

the bypass valve is formed with an upstream chamber and a downstream chamber partitioned by a valve body in a housing, an internal leakage quantity leaking from the upstream chamber to the downstream chamber and an external leakage quantity leaking to atmosphere from the downstream chamber in the fully closed state are obtained based on a leakage characteristic function, and the clearance is so provided that the internal leakage quantity is larger than the external leakage quantity.

* * * * *